(12) United States Patent
D'Aluisio et al.

(10) Patent No.: US 7,125,030 B2
(45) Date of Patent: Oct. 24, 2006

(54) SEATPOST WITH VIBRATION ISOLATION MEMBER

(75) Inventors: Christopher P. D'Aluisio, Watsonville, CA (US); Jeremy Thompson, Santa Cruz, CA (US); Jean-Luc Callahan, Morgan Hill, CA (US); Mark Schroeder, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 33 days.

(21) Appl. No.: 10/839,586

(22) Filed: May 5, 2004

(65) Prior Publication Data

US 2005/0248118 A1  Nov. 10, 2005

(51) Int. Cl.
  *B62K 3/14*  (2006.01)
  *B62J 1/26*  (2006.01)

(52) U.S. Cl. .................. 280/283; 280/281.1; 280/274; 280/275; 297/195.1; 297/199; 267/131

(58) Field of Classification Search ............... 280/283, 280/281.1, 274, 275; 297/195.1, 199; 267/131
  See application file for complete search history.

(56) References Cited

U.S. PATENT DOCUMENTS

| 1,559,277 | A |   | 10/1925 | Nelson |
|-----------|---|---|---------|--------|
| 2,236,127 | A |   | 3/1941  | Alexander |
| 2,274,747 | A |   | 3/1942  | Schwinn |
| 2,341,821 | A |   | 2/1944  | Schwinn |
| 3,941,011 | A |   | 3/1976  | Kirk |
| 4,420,989 | A |   | 12/1983 | Finkle |
| 4,583,755 | A | * | 4/1986  | Diekman et al. ........ 280/281.1 |
| 4,939,950 | A |   | 7/1990  | Girvin |
| 5,117,708 | A |   | 6/1992  | Boyer et al. |
| 5,140,867 | A |   | 8/1992  | Smith |
| 5,181,436 | A |   | 1/1993  | Lai |
| 5,186,074 | A |   | 2/1993  | Arnold |
| 5,209,138 | A |   | 5/1993  | Shu |
| 5,209,508 | A |   | 5/1993  | Lennon |
| 5,220,851 | A |   | 6/1993  | Flechel |
| 5,241,881 | A |   | 9/1993  | Chen |
| 5,253,544 | A |   | 10/1993 | Allsop et al. |
| 5,257,552 | A |   | 11/1993 | Boyer et al. |
| 5,285,697 | A |   | 2/1994  | Clausen |
| 5,319,995 | A |   | 6/1994  | Huang |
| 5,324,174 | A | * | 6/1994  | Diotte ..................... 417/234 |
| 5,377,557 | A |   | 1/1995  | Nastrucci |

(Continued)

FOREIGN PATENT DOCUMENTS

DE  20106106  6/2001

(Continued)

*Primary Examiner*—Lesley D. Morris
*Assistant Examiner*—Marlon Arce-Diaz
(74) *Attorney, Agent, or Firm*—Michael Best & Friedrich LLP

(57) ABSTRACT

A bicycle designed to reduce the transfer of vibrations to the rider. The bicycle includes a seatpost assembly comprising an inner member, an outer member at least partially surrounding a portion of the inner member, and a damping member disposed between the inner member and the outer member. The damping member provides vibration damping between the frame and the seat. Preferably, the inner member includes a necked portion positioned within the damping member. In addition, the damping member can include a body portion positioned inside the outer member and a head portion positioned longitudinally adjacent the outer member. The concepts of the present invention are also applicable to frame members of the bicycle frame, such as the chainstays, the seatstays, and the fork.

19 Claims, 6 Drawing Sheets

U.S. PATENT DOCUMENTS

| | | | |
|---|---|---|---|
| 5,382,039 A * | 1/1995 | Hawker | 280/283 |
| 5,467,665 A | 11/1995 | Huang | |
| 5,511,444 A | 4/1996 | Clausen et al. | |
| 5,657,958 A * | 8/1997 | McLaughlin et al. | 248/632 |
| 5,678,457 A | 10/1997 | Hals | |
| 5,911,430 A * | 6/1999 | Wuschke | 280/283 |
| 6,032,934 A * | 3/2000 | Wu | 267/132 |
| 6,036,164 A * | 3/2000 | Martins | 248/600 |
| 6,109,637 A | 8/2000 | Kirk | |
| 6,364,294 B1 * | 4/2002 | Gennesseaux et al. | 267/140.13 |
| 6,669,218 B1 | 12/2003 | Sinyard et al. | |
| 6,848,701 B1 * | 2/2005 | Sinyard et al. | 280/283 |
| 2002/0113403 A1 * | 8/2002 | Chen | 280/288.4 |
| 2003/0226421 A1 | 12/2003 | Livingston | |

FOREIGN PATENT DOCUMENTS

| | | |
|---|---|---|
| FR | 962682 | 6/1950 |
| FR | 1004031 | 3/1952 |
| FR | 2810291 | 6/2000 |
| WO | WO 01/96173 | 12/2001 |

* cited by examiner

SEATPOST WITH VIBRATION ISOLATION MEMBER

BACKGROUND

The present invention generally relates to bicycles, and particularly to bicycle frames that are designed to dampen vibrations.

Bicycles include a frame that receives two wheels and supports a seat for supporting the rider, and handlebars for allowing the rider to steer the bicycle. The frame includes a main frame and a front fork that rotates relative to the main frame to allow steering and control of the bicycle. The seat is typically coupled to the frame by a seatpost During a bicycle ride, the rider will often encounter bumps or uneven road conditions that cause vibrations. Many of these vibrations will travel through the wheels and the frame to the seat and handlebars. From the seat and handlebars, the vibrations can pass into the rider's torso and arms. These vibrations can be uncomfortable to the rider.

SUMMARY

The present invention provides a bicycle designed to reduce the transfer of vibrations to the rider. The bicycle includes a seatpost assembly comprising an inner member, an outer member at least partially surrounding a portion of the inner member, and a damping member disposed (e.g., bonded) between the inner member and the outer member. The damping member provides vibration damping between the frame and the seat. Preferably, the inner member includes a necked portion positioned within the damping member. In addition, the damping member can include a body portion positioned inside the outer member and a head portion positioned longitudinally adjacent the outer member.

The concepts of the present invention are also applicable to frame members of the bicycle frame, such as the chainstays, the seatstays, and the fork.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
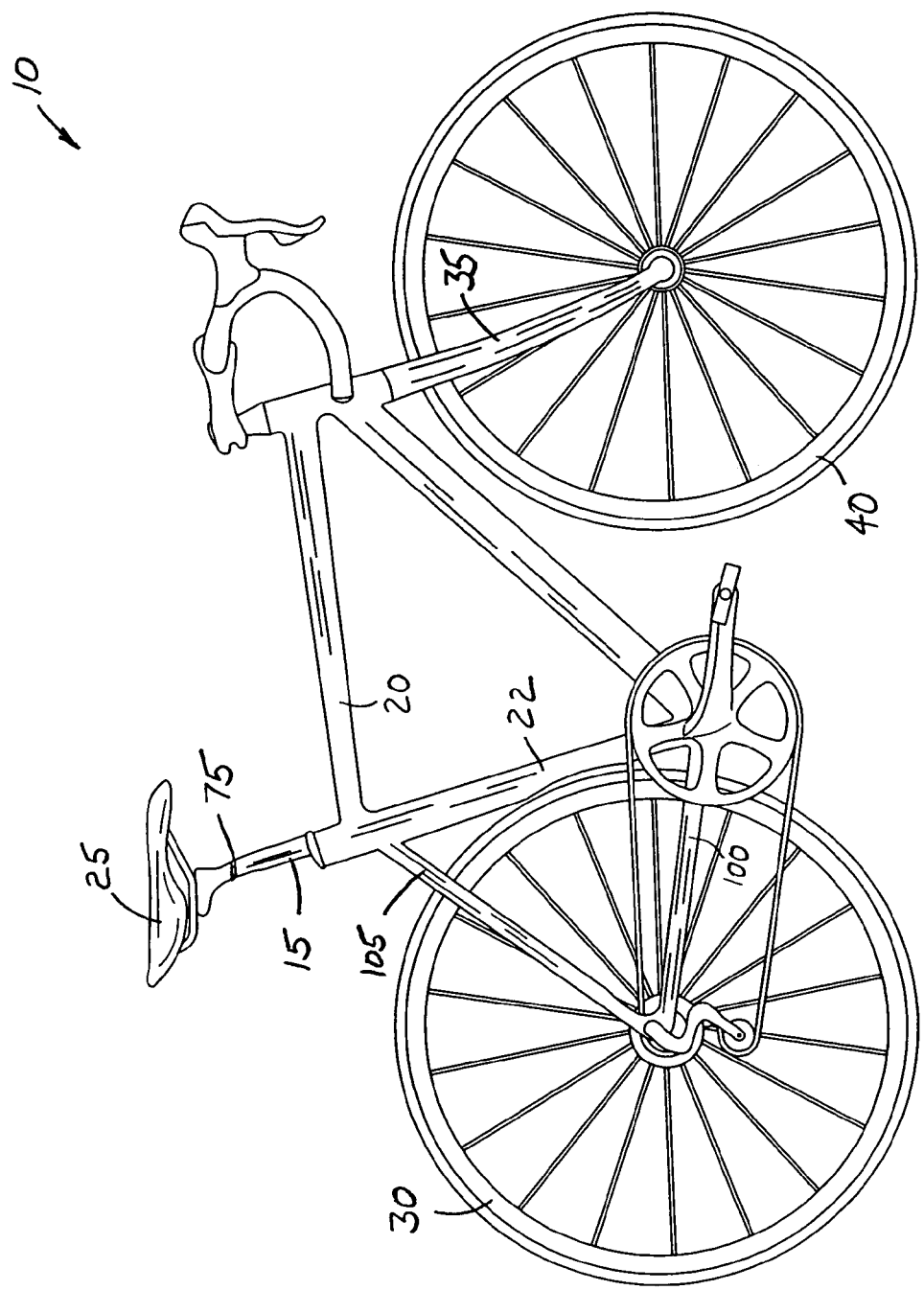
FIG. 1 is a side view of a bicycle including a seatpost assembly embodying the present invention.

FIG. 1 illustrates a bicycle 10 including a seatpost assembly 15 embodying the present invention. The bicycle 10 includes a frame 20 comprising a main frame 22 that supports a seat 25 and a rear wheel 30, and a front fork 35 that supports a front wheel 40. A rider sits on the seat 25 and pedals the bicycle 10 to rotate the rear wheel 30 and propel the bicycle 10, as is well known in the art. The front fork 35 passes through a portion of the main frame 22 and pivotally supports the front wheel 40 so that the rider is able to steer the bicycle 10. The seatpost assembly 15 is attached to, or is formed as part of, the seat 25 and facilitates the attachment of the seat 25 to the frame 20. It should be noted that the bicycle 10 shown in FIG. 1 is but one example of a bicycle suited to use with the present invention. As such, the present invention should not be limited to the illustrated example. For example, the seatpost assembly can be anything that connects the seat to the frame. Thus, while a standard seatpost assembly 15 is illustrated, other types of seatposts (e.g., cantilevered) will also function with the present invention.

Figure 2:
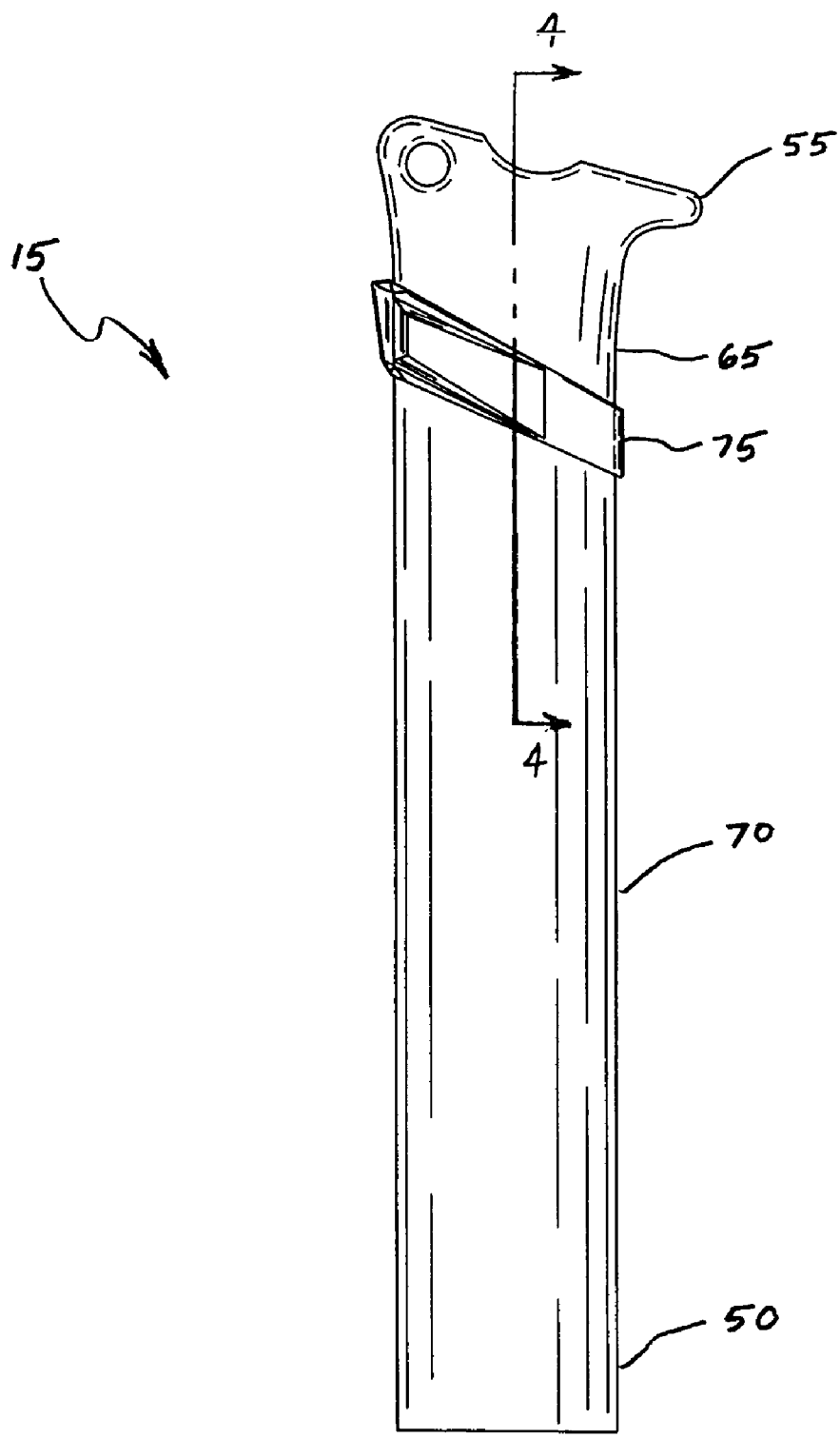
FIG. 2 is a side view of the seatpost assembly of FIG. 1.
Figure 3:
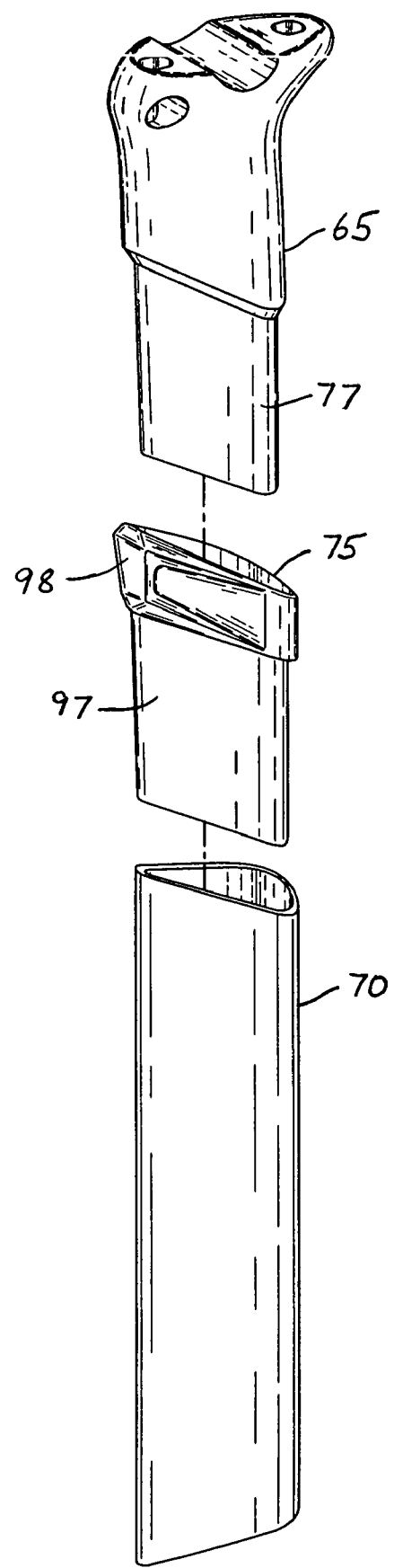
FIG. 3 is an exploded perspective view of the seatpost assembly of FIG. 2.

Referring to FIGS. 2 and 3, the seatpost assembly 15 includes a first end 50 that is designed to be inserted into the frame 20 and clamped in place, and a second end 55 designed to be secured to and support the seat 25. The seatpost assembly 15 comprises an inner member in the form of an inner tube 65, an outer member in the form of an outer tube 70, and a damping member 75. In the illustrated embodiment, the inner tube 65 and outer tube 70 are made from an aluminum alloy and have a teardrop cross section. However, other constructions may use other materials (e.g., steel, other alloys, composites such as carbon fiber/kevlar, and the like) and other shaped cross sections (e.g., circular, oval, and the like).

Figure 4:
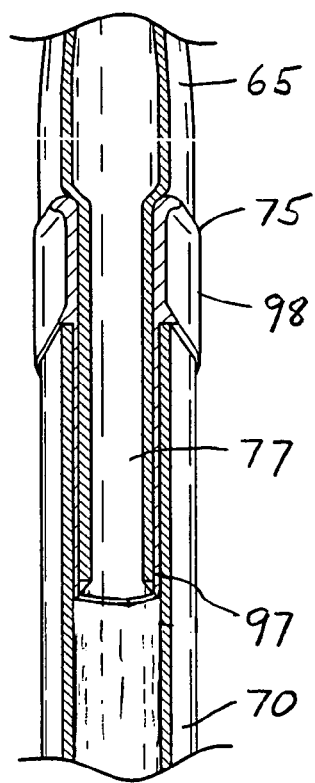
FIG. 4 is a section view taken along line 4—4 in FIG. 2.
Figure 5:
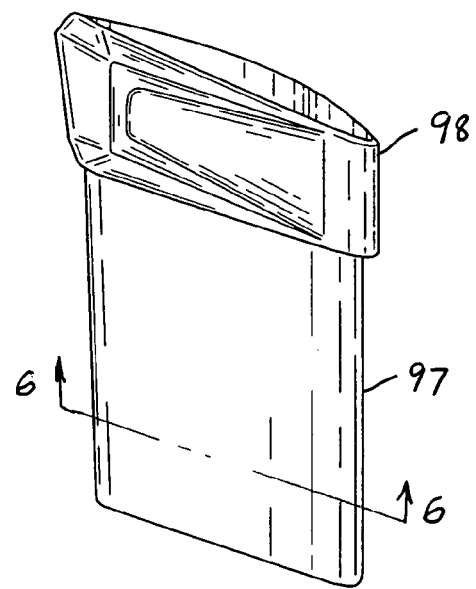
FIG. 5 is a side perspective view of the damping member of FIG. 3.

As illustrated in FIGS. 3 and 4, the inner tube 65 includes a necked portion 77 that is partially positioned in the outer tube 70. The outer tube 70 has inside dimensions that are larger than the outside dimensions of the necked portion 77. When concentrically positioned, the inner tube 65 and the outer tube 70 cooperate to define an annular gap having a thickness of about 1.5 mm. It should be understood that the thickness of the annular gap could vary while staying within the scope of the present invention.

In most constructions, the inner tube 65 and the outer tube 70 are similarly shaped (e.g., teardrop, as shown in FIGS. 2–4). In addition, the illustrated tubes 65, 70 are concentric and sized to define a substantially constant thickness gap around the perimeter and along the length of the outer tube 70. However, other constructions may employ different shaped inner and outer tubes or may employ one or more tapered tubes to vary the geometry of the gap. For example, one construction could use a circular inner tube with an octagonal outer tube. This arrangement creates a space having a thickness that varies around the tube's perimeter, but is substantially constant when measured along the length of the outer tube. In other constructions, a tapered inner tube and/or a tapered outer tube can be used to create a space having a thickness that varies along the length of the outer tube but is substantially constant when measured around the perimeter.

The damping member 75 attaches the inner tube 65 to the outer tube 70 and is bonded in place using an appropriate adhesive. The damping member 75 includes a body portion 97 positioned within the gap and inside the outer tube 70, and a head portion 98 positioned outside the gap 95 and longitudinally adjacent an end of the outer tube 70.

The damping members 75 are made from an elastomeric material. In the illustrated embodiment, the damping members 75 are made from a thermoplastic molded elastomer sold under the trademark SANTOPRENE by Advanced Elastomer Systems of Akron, Ohio. The damping members 75 could instead be made from any suitable material, such as polyurethane, plastic, natural rubber, and the like.

The illustrated body portion 97 of the damping member 75 is about 65 mm long and the illustrated head portion 98 is about 25 mm long. The standard round seatpost for a road bicycle is about 27.2 mm in diameter. The external dimensions of the illustrated outer tube 70 are about 27.2 mm×51.5 mm. The ratio of the body portion length to the minimum outer tube dimension is preferably greater than about 1.5, more preferably greater than about 2.0, and in the illustrated embodiment is about 2.39.

Referring to FIGS. 2 and 3, the damping member 75 is asymmetrical relative to a centerline of the seatpost assembly 15. More specifically, the head portion 98 is angled such that it is higher on the back of the seatpost assembly 15 than on the front.

As shown in FIG. 3, the damping member 75 of the illustrated embodiment is formed separate from the inner tube 65 and outer tube 70. The damping member 75 is subsequently slid into the outer tube 70, and the inner tube 65 is slid into the damping member 75. It should be understood that the damping member 75 could instead be molded into place between the inner tube 65 and the outer tube 70, or the inner tube 65 and the outer tube 70 could be molded into the damping member 75.

Figure 6:
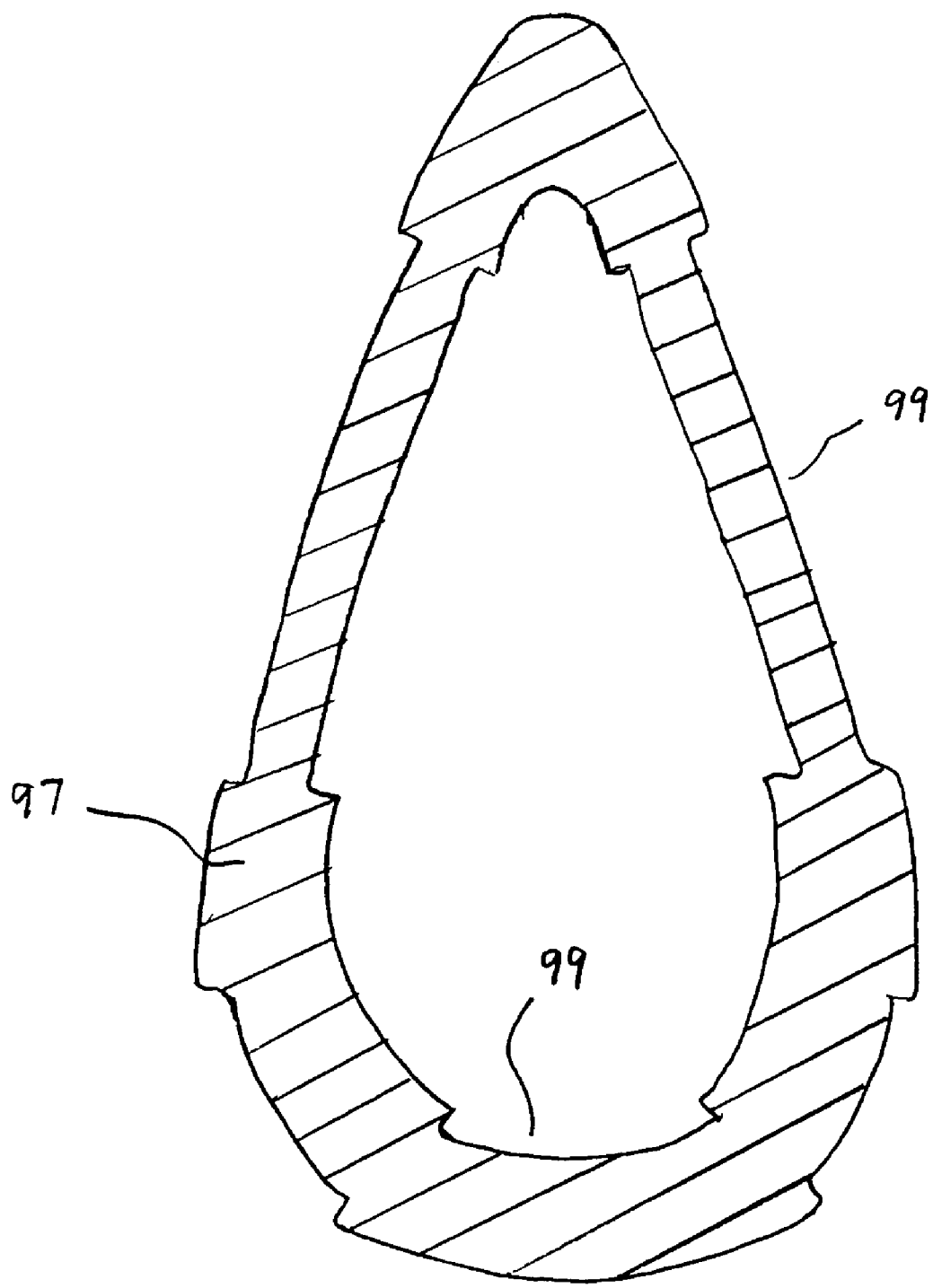
FIG. 6 is a section view taken along line 6—6 in FIG. 5 including exaggerated glue retention spaces.

Referring to FIG. 6, the damping member 75 includes recesses or adhesive retention slots 99 on its inner surfaces and on the outer surface of the body portion 97. In actual constructions, the depth of these adhesive retention slots 99 is approximately 0.05 mm, with deeper or shallower slots being possible. The slots receive and hold adhesive during assembly to provide an improved bond between the inner tube 65 and the damping member 75 and between the outer tube 70 and the damping member 75. The depth of the slots in FIG. 6 is greatly exaggerated for illustrative purposes.

To improve the bond between the inner tube 65 and the outer tube 70, some constructions roughen the outer surface of the inner tube 65 and/or the inner surface of the outer tube 70. Sanding, scoring, knurling, sandblasting, or any other suitable process can roughen the surfaces. The roughened surface produces more surface area and improves the bond between the resilient material and the roughened tube.

The thickness and durometer of the damping member 75 are chosen to achieve the desired damping, while still maintaining the desired "feel" between the rider and the bicycle 10. For example, a material with an improper durometer and thickness may provide significant damping but may feel "soft" to the rider. On the other hand, a high durometer coupled with a thin damping member 75 may result in insufficient damping. Testing has shown that a damping member 75 having a durometer of about 80 on the A scale and a thickness of about 1.5 mm provides adequate damping without adversely affecting the feel of the bicycle 10 to the rider. Of course, other constructions with higher or lower durometer values and thinner or thicker damping members 75 may achieve suitable results depending on the particular application.

In use, the seatpost assembly 15 is attached to the frame 20 of the bicycle 10 by clamping it in the seat tube. Vibrations picked up by the frame 20 are transmitted to the seatpost assembly 15. The damping member 75 provides damping between the outer tube 70 and the inner tube 65, thus isolating the rider from at least a portion of the vibrations encountered by the bicycle 10. It should be understood that the present invention could also be used in connection with other frame members, such as the frame members associated with the frame. For example, damping members similar to those described above could be applied to the chainstays 100, the seatstays 105, or the fork 35.

Figure 7:
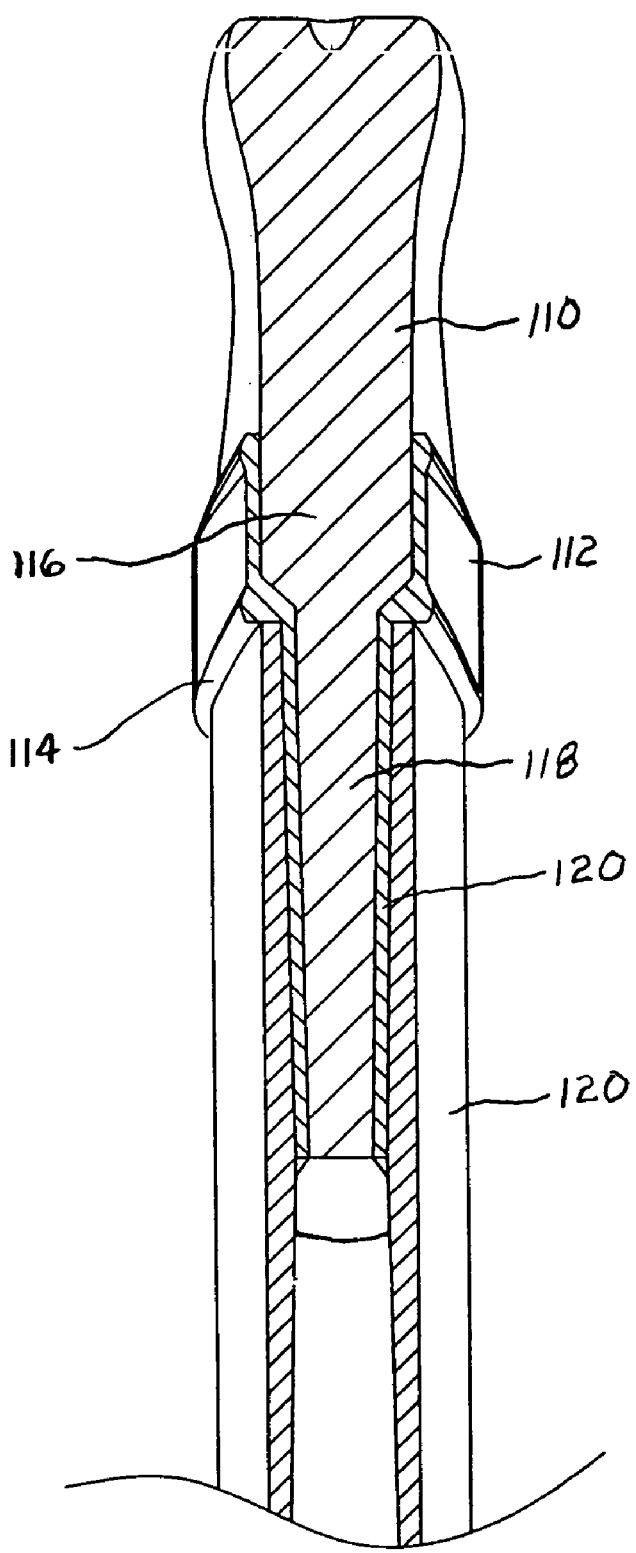
FIG. 7 is a section view of an alternative design taken along the same plane as FIG. 4.

An alternative design of the seatpost assembly is illustrated in FIG. 7. In this design, the inner member 110 is solid instead of hollow. In addition, the head portion 112 of the damping member 114 extends upward onto the non-necked portion 116 of the inner member 110. Further, the necked portion 118 of the inner member 110, the body portion 120 of the damping member 114, and the interior surface of the outer tube 120 are tapered at about 1 degree, relative to a center axis, along their length of engagement with each other. The taper is exaggerated for illustration in FIG. 7. This taper enhances the ability to control the adhesive thickness, improves fit of the parts, and creates a joint that receives both normal and shear forces, which is believed to enhance the strength of the joint.

Although the invention has been described in detail with reference to certain preferred embodiments, variations and modifications exist within the scope and spirit of the invention as described and defined in the following claims.

What is claimed is:

1. A bicycle comprising:
 a frame;
 a wheel supported by the frame;
 a seat; and
 a seatpost assembly coupling the seat to the frame and including:
  an inner member;
  an outer member at least partially surrounding a portion of the inner member; and
  a damping member disposed radially between the inner member and the outer member and providing vibration damping between the frame and the seat, and wherein the damping member is the only source of connection between the inner member and the outer member.

2. The bicycle of claim 1, wherein the damping member bonds the inner member to the outer member.

3. The bicycle of claim 1, wherein the damping member extends beyond an end of the outer member.

4. The bicycle of claim 1, wherein the inner member includes a necked portion positioned within the damping member.

5. The bicycle of claim 1, wherein the inner member and the outer member cooperate to define a gap therebetween, and wherein the damping member comprises a body portion positioned in the gap.

6. The bicycle of claim 1, wherein the damping member comprises:
 a body portion positioned inside the outer member; and
 a head portion positioned longitudinally adjacent the outer member.

7. The bicycle of claim 1, wherein the damping member comprises a molded elastomer.

8. A seatpost assembly adapted to couple a seat to a bicycle frame, the seatpost assembly comprising:
 an inner member;

an outer member at least partially surrounding a portion of the inner member; and a damping member disposed inside the outer member, between the inner member and the outer member, and wherein the damping member is the only source of connection between the inner member and the outer member.

9. The seatpost assembly of claim 8, wherein the damping member bonds the inner member to the outer member.

10. The seatpost assembly of claim 8, wherein the damping member extends beyond an end of the outer member.

11. The seatpost assembly of claim 8, wherein the inner member includes a necked portion positioned within the damping member.

12. The seatpost assembly of claim 8, wherein the inner member and the outer member cooperate to define a gap therebetween, and wherein the damping member comprises a body portion positioned in the gap.

13. The seatpost assembly of claim 8, wherein the damping member comprises:
   a body portion positioned inside the outer member; and
   a head portion positioned longitudinally adjacent the outer member.

14. The seatpost assembly of claim 8, wherein the damping member comprises a molded elastomer.

15. A bicycle comprising:
   a wheel; and
   a frame coupled to the wheel and including a frame member, wherein the frame member comprises:
      an inner member;
      an outer member at least partially surrounding a portion of the inner member; and
      a damping member disposed inside the outer member, between the inner member and the outer member and providing vibration damping between the inner member and the outer member, and wherein the inner member and the outer member cooperate to define a gap therebetween, and wherein the damping member comprises a body portion positioned in the gap.

16. The bicycle of claim 15, wherein the damping member extends beyond an end of the outer member.

17. The bicycle of claim 15, wherein the inner member includes a necked portion positioned within the damping member.

18. The bicycle of claim 15, wherein the damping member comprises:
   a body portion positioned inside the outer member; and
   a head portion positioned longitudinally adjacent the outer member.

19. The bicycle of claim 15, wherein the damping member comprises a molded elastomer.

* * * * *